(12) United States Patent
Shemtov (10) Patent No.: US 7,897,871 B1
(45) Date of Patent: Mar. 1, 2011

(54) JUNCTION BOX WITH INTEGRATED CONNECTORS FOR ELECTRICAL WIRING

(76) Inventor: Sami Shemtov, Hollywood, FL (US)

( * ) Notice: Subject to any disclaimer, the term of this patent is extended or adjusted under 35 U.S.C. 154(b) by 297 days.

(21) Appl. No.: 12/256,222

(22) Filed: Oct. 22, 2008

(51) Int. Cl.
*H02G 3/18* (2006.01)
(52) U.S. Cl. ............... 174/59; 174/50; 174/63; 174/663; 174/135; 248/906; 439/535
(58) Field of Classification Search ............... 174/50, 174/58, 63, 663, 135; 220/3.2; 248/906; 439/535
See application file for complete search history.

(56) References Cited

U.S. PATENT DOCUMENTS

| | | | | |
|---|---|---|---|---|
| 2,000,850 A | * | 5/1935 | Knell | 220/3.2 |
| 3,728,470 A | * | 4/1973 | Maier | 174/58 |
| 5,013,872 A | * | 5/1991 | Lockwood et al. | 174/663 |
| 6,800,808 B1 | * | 10/2004 | Chung | 174/59 |
| 6,818,823 B2 | * | 11/2004 | Barnes | 174/50 |
| 7,186,915 B2 | * | 3/2007 | Hull et al. | 174/50 |
| 7,476,817 B1 | * | 1/2009 | Shemtov | 174/661 |
| 7,824,213 B1 | * | 11/2010 | Korcz et al. | 439/552 |

* cited by examiner

*Primary Examiner* — Dhiru R Patel
(74) *Attorney, Agent, or Firm* — Craig A. Fieschko, Esq.; DeWitt Ross & Stevens S.C.

(57) ABSTRACT

A junction box for electrical wiring includes one or more wiring connectors non-removably pre-mounted to side panels thereof. A variety of different connector types for supporting a variety of different types of electrical cables and wiring conduits may be provided in a single junction box. Removable plugs are provided to block the connector passageways, but are easily removed from those connectors that are to be used for wiring in a particular installation. Since built-in connectors of various types are provided, end-user installation time is reduced.

14 Claims, 8 Drawing Sheets

JUNCTION BOX WITH INTEGRATED CONNECTORS FOR ELECTRICAL WIRING

FIELD OF THE INVENTION

This invention pertains generally to electrical wiring components, and, more specifically, to junction boxes for electrical wiring and to connectors for securing electrical wires to such junction boxes.

BACKGROUND OF THE INVENTION

An electrical junction box is a container for electrical wiring connections, usually intended to conceal them from sight and, to some extent, to eliminate tampering. In the electrical trade, junction boxes are often installed in buildings at points where electrical wires are to be connected to each other or to electrical components such as sockets, switches, electrical outlets, or the like. A junction box typically takes the form of a small metal or plastic container or compartment having at least one open wall, that provides access to the interior of the junction box and which may be covered by a removable junction box cover, and having entries or apertures defined in one or more other walls of the box, to allow electrical wiring to be brought into the interior of the box. A junction box is installed at the point where an electrical connection is desired, usually within the wall or ceiling of a building, by nailing or screwing the junction box to a stud or other support within the wall or ceiling. Typically, fastener apertures are provided in one or more of the walls of the junction box, to receive the nails or screws and thus facilitate mounting the junction box in a desired position.

Electrical wiring is brought into an electrical junction box by extending the wiring through an entry point wiring aperture in a wall of the junction box into the junction box interior. For a metal junction box, these wiring apertures are formed typically by punching circular apertures of the desired size through the metal walls of the junction box. Multiple such apertures may thus be formed in multiple walls of the junction box in order to make many wiring entry points available at various positions around the junction box. In forming the wiring apertures, the walls of the metal junction box typically are punched so that a metal "knockout" remains in place covering the aperture, but remains attached to the wall of the junction box only by a small piece of metal. A selected knockout is removed to open a wiring aperture in the junction box by pushing, pulling, twisting, or otherwise moving the knockout, typically using a tool, such as pliers, to break the remaining connection between the knockout and the junction box wall. Thus, open wiring apertures are formed in the junction box only where needed for wiring to enter the junction box. The remaining potential wiring apertures remain covered by knockouts, so that the junction box does not have large holes in it that are not occupied by wiring.

Since it is desirable to secure electrical wiring to the junction box at its point of entry, connectors have been developed to join the wiring and the junction box together at the point of entry, to prevent the wiring from being pulled easily from the junction box. Since various forms of wiring may be used in an electrical wiring project (e.g., including flexible metal-clad or armored cable, flexible metal conduit, rigid plastic or metal conduit, etc.), various different types of connectors have been developed for securing such wiring to a junction box at the point of entry. Typically such connectors are formed to have a threaded end. The connector is mounted to the junction box by extending the threaded end of the connector through an open wiring aperture in the junction box wall into the interior of the junction box, with the main body of the connector positioned on the outside of the junction box. A threaded ring is threaded onto the threaded end of the connector positioned within the junction box and tightened such that the junction box wall is pinched between the connector body and the threaded ring, thereby to secure the connector to the junction box. Typically the threaded ring is provided with indentations or extensions formed on the outer periphery thereof, to facilitate pushing on the ring at the periphery using a screw driver or other tool in order to tighten the threaded ring more securely.

The foregoing arrangement for running electrical wiring into a junction box can be inconvenient and difficult to perform. The steps of removing a knockout, selecting a wiring connector, and mounting the wiring connector on the junction box can be time consuming and typically require the use of one or more tools, often requiring that an electrician or other installer pick items up, set them down, switch them from hand to hand, etc., which can rapidly grow tedious and annoying. Moreover, in many instances, often where the junction box is being mounted in existing construction, but also sometimes in new construction, this operation must be performed within tight confines (e.g., within a small hole in a wall), or even "blind" (i.e., by touch). Furthermore, these steps must be repeated for each wiring connection before the wiring can be run into the junction box. Additionally, such an operation typically requires the installer to have several different types of wiring connectors, for several different types of wiring, readily at hand. This may require the installer to dig though connectors of various types, that inevitably have become mixed together, in order to find one of the desired type to install on the junction box.

SUMMARY OF THE INVENTION

The present invention provides a junction box with integrated connectors for electrical wiring that is intended to solve at least partially the aforementioned problems. To give the reader a basic understanding of some of the advantageous features of the invention, following is a brief summary of an exemplary preferred version of a junction box with integrated connectors in accordance with the present invention. As this is merely a summary, it should be understood that more details regarding preferred embodiments of the present invention may be found in the Detailed Description set forth below. The Claims set forth at the end of this document define the various version of the invention in which exclusive rights are secured.

Figure 1:
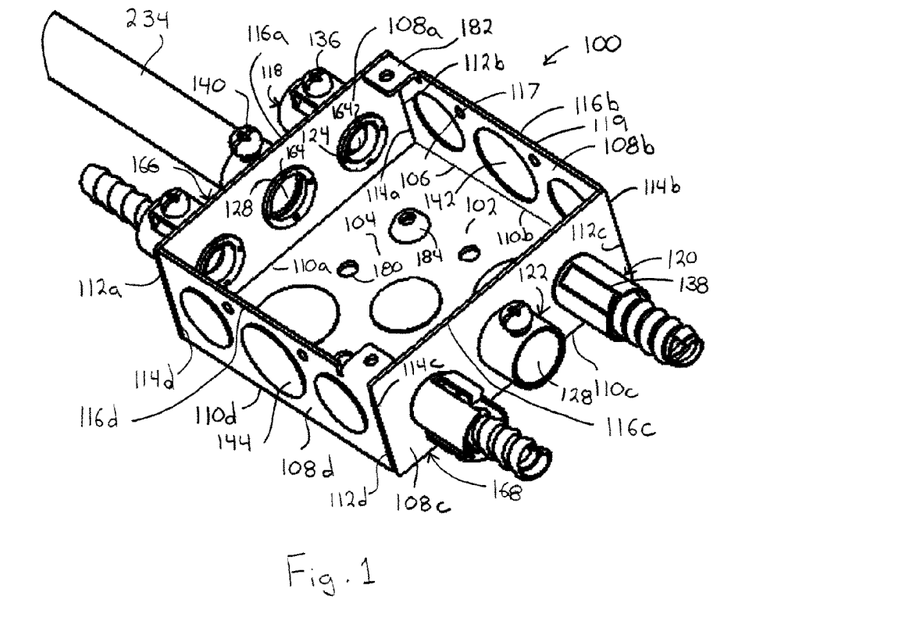
FIG. 1 is a front perspective view illustration of an exemplary junction box with integrated connectors for electrical wiring in accordance with the present invention.

An exemplary junction box with integrated connectors 100 for electrical wiring in accordance with the present invention is illustrated in FIG. 1. The junction box 100 includes a back panel 102, having a front surface 104 and a peripheral edge 106, and a plurality of side panels 108a-d. Each of the plurality of side panels 108a-d includes a rear peripheral edge 110a-d, side peripheral edges 112a-d and 114a-d perpendicular to the rear peripheral edge 110a-d, and a front peripheral edge 116a-d perpendicular to the side peripheral edges 112a-d and 114a-d and parallel to the rear peripheral edge 110a-d. The plurality of side panels 108a-d are attached along the rear peripheral edges 110a-d thereof to the back panel 102 along the peripheral edge 106 of the back panel 102 and perpendicular thereto such that a side peripheral edge 112a-d of each of the plurality of side panels 108a-d is adjacent to a side peripheral edge 114a-d of another of the plurality of the side panels 108a-d to form, along with the back panel 102, a junction box interior 117 having an open side 119 defined by the front peripheral edges 116a-d of the plurality of side panels 108a-d.

Figure 2:
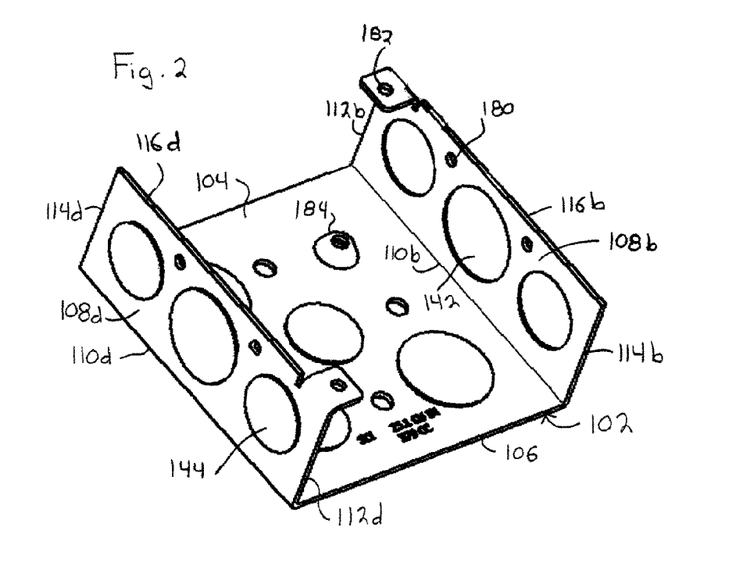
FIG. 2 is a front perspective view illustration of a back panel and two side panels of the exemplary junction box with integrated connectors of FIG. 1.

As illustrated in FIG. 2, one or more of the plurality of side panels 108b and 108d may be attached to the back panel 102 by integrally forming the side panels 108b and 108d with the back panel 102. For example, the back panel 102 and side panels 108b and 108d may be formed from a single flat piece of metal, such as a steel sheet, that is punched or cut to the appropriate size and shape and then bent to form the back panel 102 and the side panels 108b and 108d in their final form (i.e., to form the rear peripheral edges 110b and 110d of the side panels 108b and 108d and part of the peripheral edge 106 of the back panel 102).

A junction box with integrated connectors for electrical wiring in accordance with the present invention may be basically square or rectangular in shape, e.g., having a square or rectangular back panel 102 and four side panels 108a-b. Alternatively, a junction box with integrated connectors for electrical wiring in accordance with the present invention may have any other desired shape. For example, an octagonal junction box having an octagonal back panel and eight side panels is one alternative possibility.

Returning to FIG. 1, in accordance with the present invention, at least one wiring connector 118, 120, or 122 is non-removably pre-mounted to at least one of the plurality of side panels 108a-b. More preferably, at least one wiring connector 118, 120, or 122 is non-removably pre-mounted to each of more than one of the plurality of side panels 108a-b. Also more preferably, a plurality of wiring connectors 118, 120, or 122 are non-removably pre-mounted to at least one of the plurality of side panels 108a-d.

In accordance with the present invention, the wiring connectors 118, 120, and 122 non-removably pre-mounted to the side panels 108a-d of a junction box 100 in accordance with the present invention may include a variety of different types of wiring connectors adapted to connect a variety of different types of wiring to the junction box 100. For example, such different types of wiring connectors may include double-bite flexible cable connectors 118, crimp-type flexible cable connectors 120, and wiring conduit connectors 122. Each of these different types of wiring connectors will be described in more detail below. It should be understood that various other current or future wiring connector types, for various other current or future types of electrical wiring, may be provided in a junction box with integrated connectors for electrical wiring in accordance with the present invention, either in addition to or in place of those illustrated and described herein.

Figures 4A, 4B, 4C:
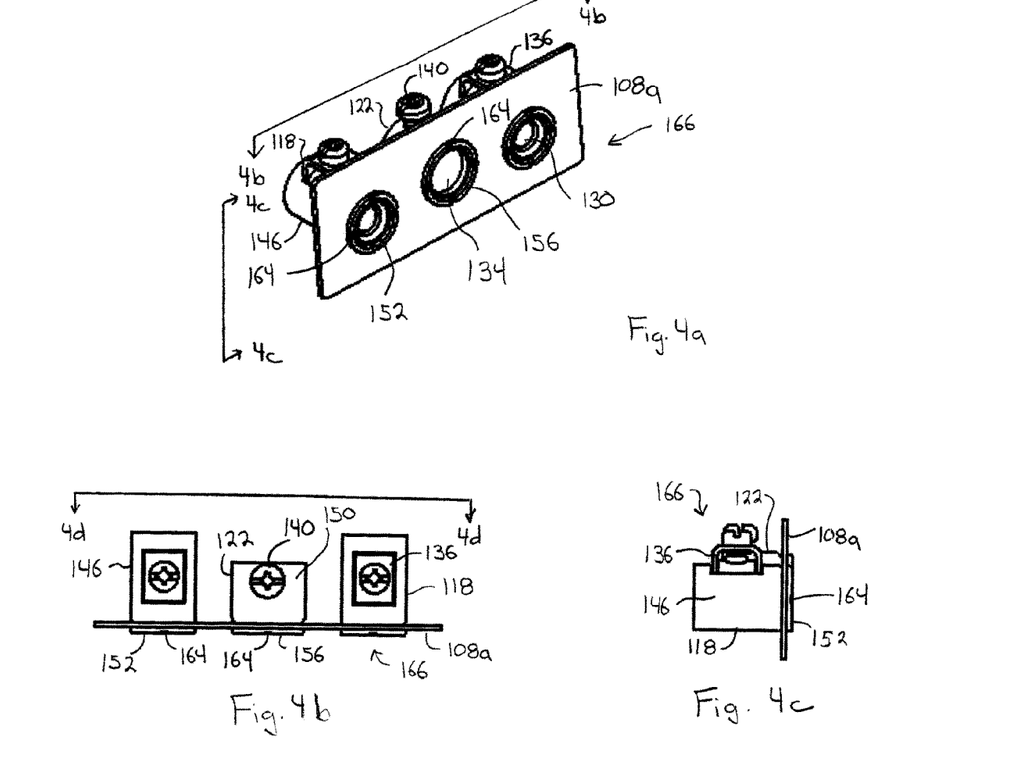
Figure 4D:
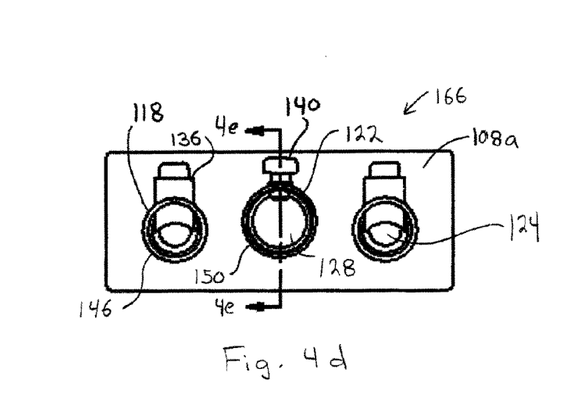
FIG. 4d is a front plan view illustration of the exemplary side panel assembly of FIG. 4a, as taken along line 4d-4d of FIG. 4b.
Figure 4E:
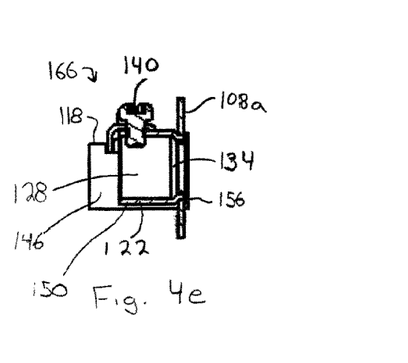
FIG. 4e is a cross-section illustration of the exemplary side panel assembly of FIG. 4a, as taken along line 4e-4e of FIG. 4d.
Figures 5A, 5B, 5C:
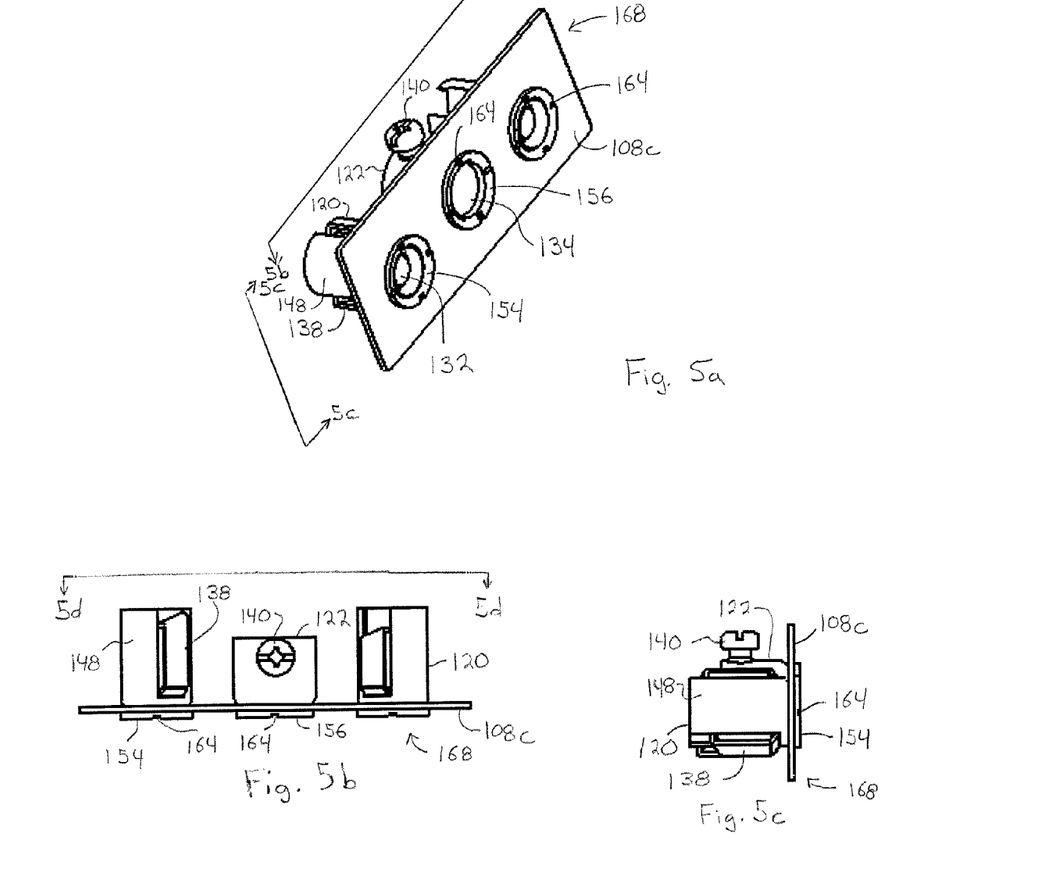
Figure 5D:
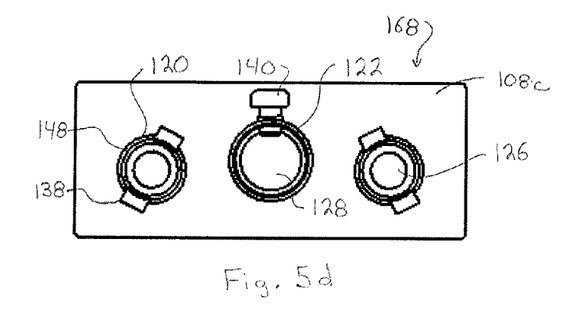
FIG. 5d is a front plan view illustration of the exemplary side panel assembly of FIG. 5a, as taken along line 5d-5d of FIG. 5b.

Referring, for more detail, to FIGS. 4 and 5, each wiring connector 118, 120, or 122 defines a passageway 124, 126, or 128, respectively, for wiring into the junction box interior 117. Preferably each wiring connector 118, 120, or 122 non-removably pre-mounted to the junction box side panels 108a-b includes a removable plug 130, 132, or 134, blocking the passageway 124, 126, or 128, respectively, as will be described in more detail below. Since all of the wiring connectors 118, 120, or 122 attached to a junction box 100 in accordance with the present invention may not be used for any particular installation, the removable plugs 130, 132, or 134 are provided so that there are no large holes or open passageways into the junction box 100 that are not occupied by wiring. For those connectors 118, 120, or 122 that will support electrical wiring in a particular installation of the junction box 100, the removable plug 130, 132, or 134 is easily removed from those particular connectors 118, 120, or 122 before wiring is run through them into the junction box 100.

Each wiring connector 118, 120, or 122 also includes a connector structure 136, 138, or 140, respectively, preferably positioned outside of the interior 117 of the junction box 100, for attaching wiring to the connector 118, 120, or 122, as also will be described in more detail below. The connector structure 136, 138, or 140 used for any particular connector 118, 120, or 122 will depend upon the type of wiring that is to be supported by the connector 118, 120, or 122 and the particular manner in which such wiring is to be supported.

As shown in FIGS. 1 and 2, at least one of the plurality of side panels 108b or 108d of a junction box 100 in accordance with the present invention may include one or more conventional wiring apertures 142 formed therethrough, to permit the mounting of conventional wiring connectors to the side panels 108b or 108d of the junction box 100. The conventional wiring apertures 142 may include standard circular wiring apertures, e.g., ½ inch or ¾ inch in diameter, or may be of any other size or shape. Each of the wiring apertures 142 preferably is covered by a removable plug or knockout 144. The wiring apertures 142 and plugs 144 may be formed in a conventional manner, e.g., by stamping.

Figure 3A:
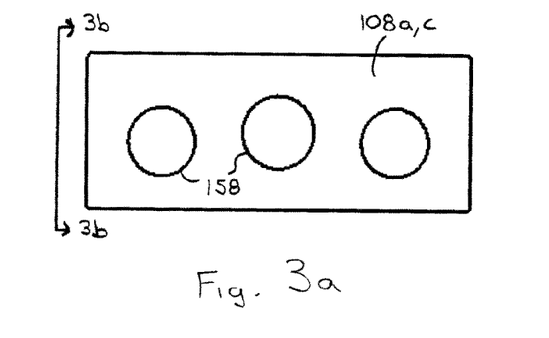
FIG. 3a is a front plan view illustration of a side panel of the exemplary junction box of FIG. 1.
Figure 3B:
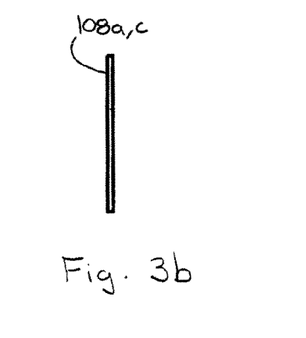

With reference now particularly to FIGS. 3-5, and as will be described in more detail below, each of the wiring connectors 118, 120, or 122 non-removably mounted to the side panels 108a-d preferably includes a body portion 146, 148, or 150, respectively, including the connector structure 136, 138, or 140, and a narrower neck portion 152, 154, or 156, respectively, having a first end thereof attached to the body portion 146, 148, or 150, and an open opposite distal end thereof. In accordance with the present invention, the connectors 118, 120, or 122 preferably are non-removably pre-mounted to the side panels 108a-d by extending the neck portion 152, 154, or 156 of the connector 118, 120, or 122 through a mounting aperture 158 formed in the side panel 108a or 108c (e.g., by punching entirely through the side panel 108a or 108c) and then bending the neck portion 152, 154, or 156 at the distal end thereof radially outward against the side panel 108a or 108c (i.e., swaging around the mounting aperture 158) to form a flange, thereby to pinch the side panel 108a or 108c between the flange and the body portion 146, 148, or 150 of the connector 118, 120, or 122 at the mounting aperture 158 formed in the side panel 108a or 108c. The flange formed from the neck portion 152, 154, or 156 preferably is dented 164 into the side panel 108a or 108c at one or more locations thereon, thereby to prevent rotation of the connector 118, 120, or 122 with respect to the side panel 108a or 108d.

Figures 6A, 6B:
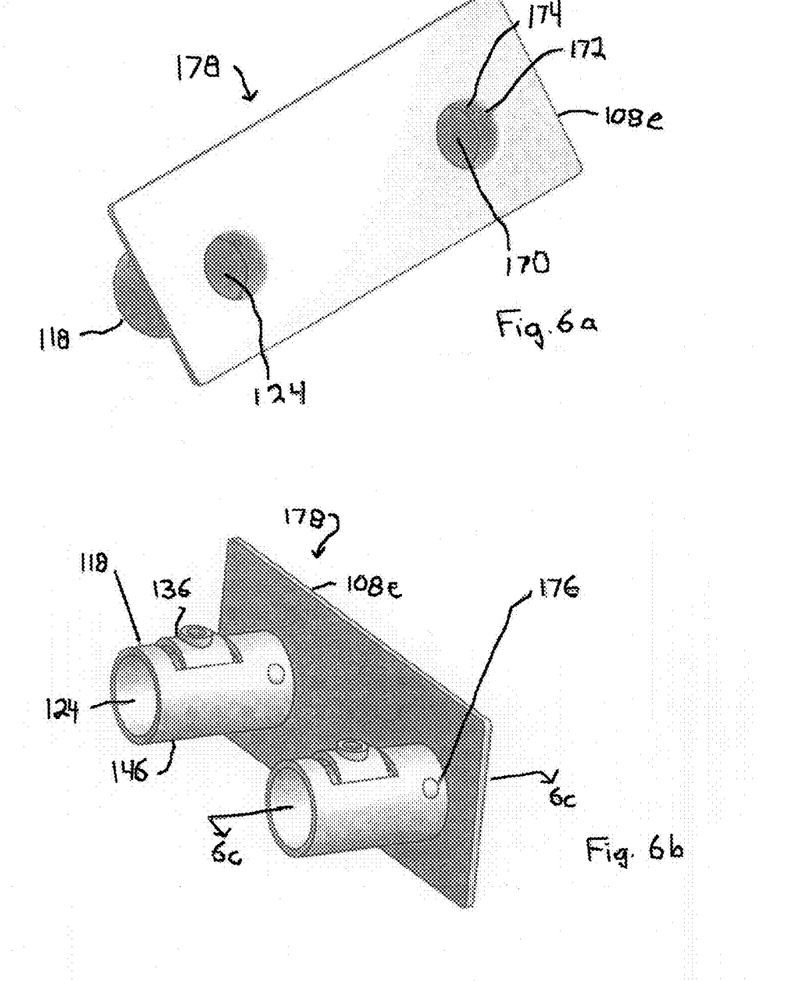
Figure 6C:
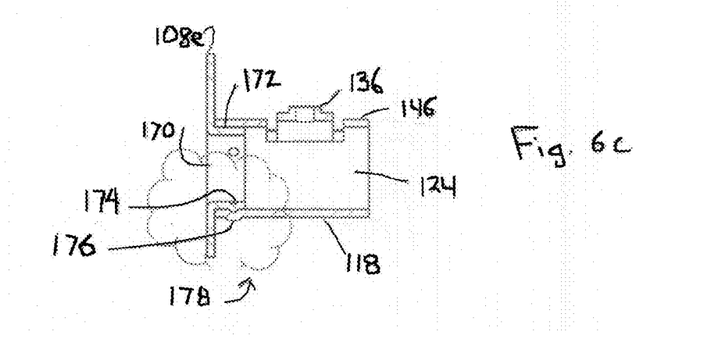
FIG. 6c is a cross section view illustration of the exemplary side panel assembly of FIG. 6a, as taken along line 6c-6c of FIG. 6b.

An alternative preferred method of non-removably mounting a wiring connector 118 to a side panel 108e in accordance with the present invention is illustrated in FIG. 6. In this case, the mounting apertures 170 formed in the side panel 108e are formed by drawing to provide a collar 172 that extends around the mounting aperture 170 and perpendicular to the side panel 108e on the side thereof that will be on the outside of the junction box 100. In this case, the connector 118 to be mounted to the side panel 108e does not include a neck portion. Rather, the connector 118 may be non-removably mounted to the side panel 108e by first press fitting the body 146 of the connector 118 over the collar 172. The connector 118 is then permanently joined to the collar 172 by partially punching at least one location, and preferably at a plurality of locations, where the body 146 of the connector 118 overlaps the collar 172. This forms interlocking dimples 174 and 176 in the collar 172 and in the body 146 of the connector 118, respectively. The interlocking dimples 174 and 176 permanently attach the connector 118 to the side panel 108e and prevent rotation of the connector 118 with respect to the side panel 108e, similar to a twist-lock connection.

Preferably, the foregoing methods of non-removably mounting the connectors 118, 120, or 122 to the side panels 108a, 108c, or 108e, may be used to mount one or more connectors 118, 120, or 122 to a side panel piece 108a, 108c, or 108e having the mounting apertures 158 or 170 formed therein and that is formed separate from the rest of the junction box 100 (e.g., as shown in FIGS. 3 and 6), to form a side panel assembly 166, 168, or 178 (as shown in FIGS. 4, 5, and 6). The side panel assemblies 166, 168, or 178 may then be attached to the back panel 102 of the junction box 100, as well as to adjacent side panels 108b and 108d, in a convention manner, e.g., by welding, to complete the junction box 100.

The present invention thus provides a junction box 100 with integrated connectors 118, 120, 122 for electrical wiring that increases the ease, speed, and efficiency with which electrical wiring can be run through a junction box. Since the present invention provides a junction box 100 in which wiring connectors 118, 120, 122 of various types are pre-mounted, once an electrician or other installer has mounted the box 100, e.g., in a wall or ceiling, he is ready to go for running wiring through the box 100, without the need for selecting and mounting wiring connectors to the box. Thus, installation time is saved. This is particularly beneficial where the installation must be made in a difficult to access location.

Further objects, features, and advantages of the invention will appear more fully from the following detailed description of the exemplary preferred embodiment of the invention made in conjunction with the accompanying drawings.

BRIEF DESCRIPTION OF THE DRAWINGS

FIG. 3b is a side view illustration of the side panel of FIG. 3a, as taken along line 3b-3b of FIG. 3a.

FIG. 4a is a perspective view illustration of a first exemplary side panel assembly of the exemplary junction box of FIG. 1.

FIG. 4b is a top plan view illustration of the exemplary side panel assembly of FIG. 4a, as taken along line 4b-4b of FIG. 4a.

FIG. 4c is a side view illustration of the exemplary side panel assembly of FIG. 4a, as taken along line 4c-4c of FIG. 4a.

FIG. 5a is a perspective view illustration of a second exemplary side panel assembly of the exemplary junction box of FIG. 1.

FIG. 5b is a top plan view illustration of the exemplary side panel assembly of FIG. 5a, as taken along line 5b-5b of FIG. 5a.

FIG. 5c is a side view illustration of the exemplary side panel assembly of FIG. 5a, as taken along line 5c-5c of FIG. 5a.

FIG. 6a is a back perspective view illustration of another exemplary side panel assembly for a junction box with integrated connectors for electrical wiring in accordance with the present invention.

FIG. 6b is a front perspective view illustration of the exemplary side panel assembly of FIG. 6a.

FIG. 7b is a cross-section view of the exemplary double bite flexible cable connector of FIG. 7a.

FIG. 7c is an end view of the exemplary double bite flexible cable connector of FIG. 7a, as taken along line 7c-7c of FIG. 7a.

FIG. 8b is a front plan view of the exemplary throat insert of FIG. 8a.

FIG. 8c is a side view of the exemplary throat insert of FIG. 8a.

FIG. 8d is a cross-section view of the exemplary throat insert of FIG. 8a, as taken along line 8d-8d of FIG. 8b.

FIG. 9b is a second perspective view illustration of the exemplary crimp-type flexible cable connector of FIG. 9a.

FIG. 9c is a side plan view of the exemplary crimp-type flexible cable connector of FIG. 9a.

FIG. 10b is a side view of the wiring conduit connector of FIG. 10a.

FIG. 10c is a cross-section view of the wiring conduit connector of FIG. 10a, as taken along line 10c-10c of FIG. 10a.

FIG. 11b is a front plan view of the exemplary knockout plug of FIG. 11a.

FIG. 11c is a side view of the exemplary knockout plug of FIG. 11a.

DETAILED DESCRIPTION OF THE INVENTION

The foregoing discussion relates to an exemplary preferred version of a junction box with integrated connectors for electrical wiring in accordance with the present invention. It should be understood, however, that the invention is not limited solely to this exemplary version. Numerous modifications are possible, and examples follow.

With reference to FIGS. 1 and 2. The junction box 100 itself may be formed of metal, such as galvanized or other steel, or of any other appropriate material, using known manufacturing techniques. The box 100 may be formed to include additional conventional or other useful junction box structures and features. Such additional structures may include box mounting holes 180, formed in the back panel 102 and side panels 108*a-d* of the box 100. The mounting holes 180 are sized to receive fasteners, such as nails or screws, for mounting the junction box 100 to a support structure, such as a wood stud. A cover mounting structure 182 preferably is provided for attaching a conventional junction box cover (not shown) to the junction box 100, to cover the open side 119 of the junction box 100 in a conventional manner. A grounding structure 184 may be formed as a raised portion of the back panel 102 having a threaded opening formed therein. This structure may be used for grounding the junction box 100 and the wiring therein by attaching the wiring ground wires to the grounding structure 184, e.g. using a screw or other appropriate fastener.

As discussed above, a variety of different types of connectors 118, 120, 122 may be non-removably pre-mounted to a junction box 100 with integrated connectors in accordance with the present invention. Such different types of connectors 118, 120, 122 are designed to support different types of wiring, or to support different types of wiring in different ways. A few exemplary connectors 118, 120, 122 of different types will now be described in more detail. As mentioned above, however, the present invention is not limited to the exemplary types of connectors illustrated and described herein. Rather, any currently known or future type of wiring connector may be used for a junction box with integrated connectors in accordance with the present invention.

Figure 7A:
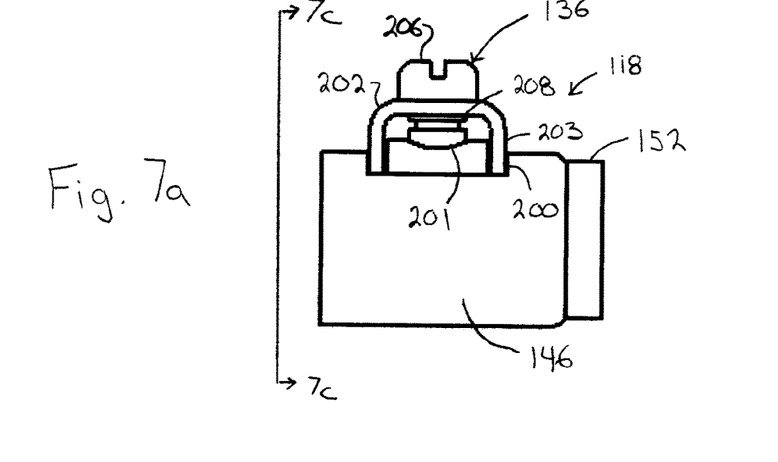
FIG. 7a is a side plan view of an exemplary double bite flexible cable connector for use in a junction box with integrated connectors in accordance with the present invention.
Figure 7B:
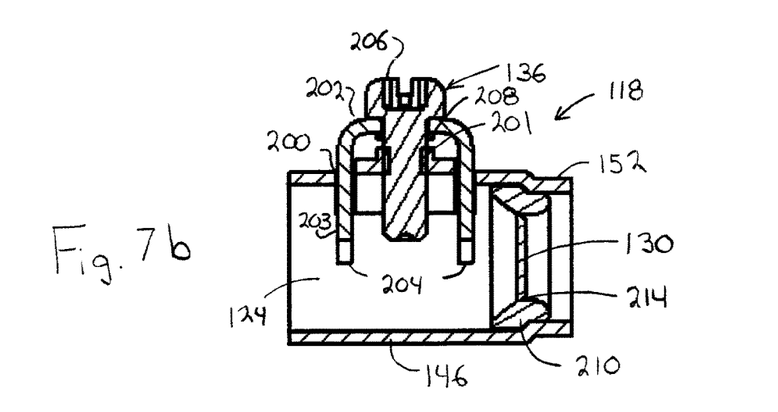
Figure 7C:
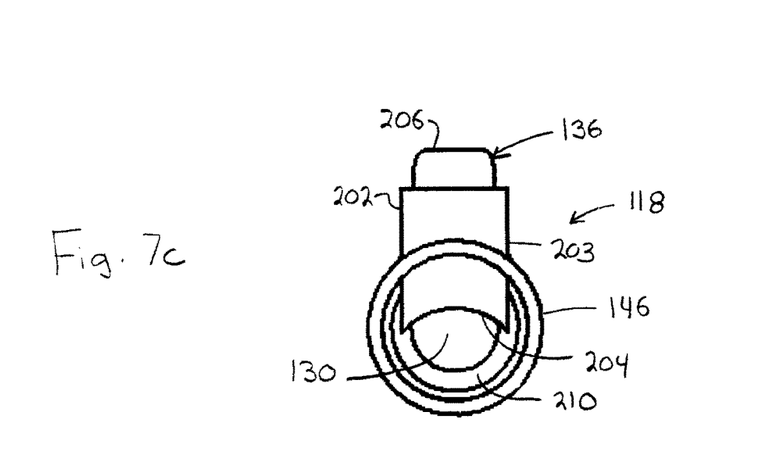
Figure 8A:
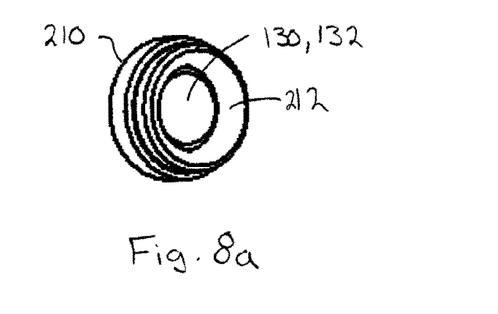
FIG. 8a is a perspective view illustration of an exemplary throat insert for use in a connector for a junction box with integrated connectors for electrical wiring in accordance with the present invention.
Figure 8B:
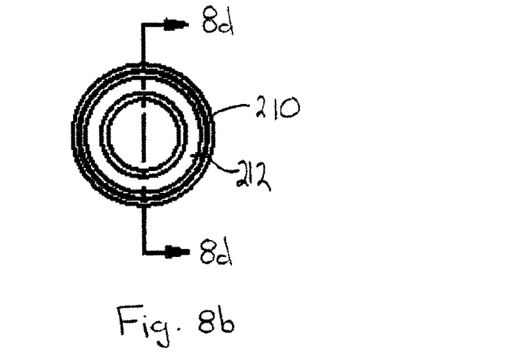
Figures 8C, 8D:
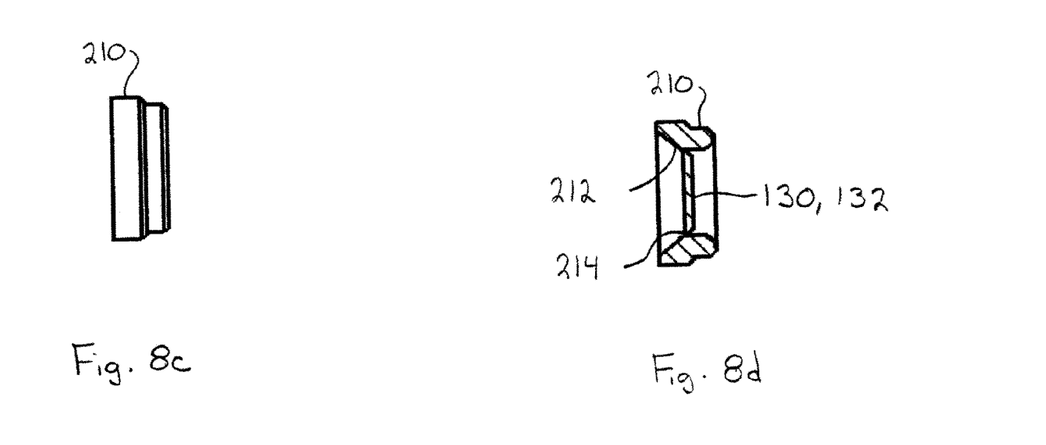
Figure 9A:
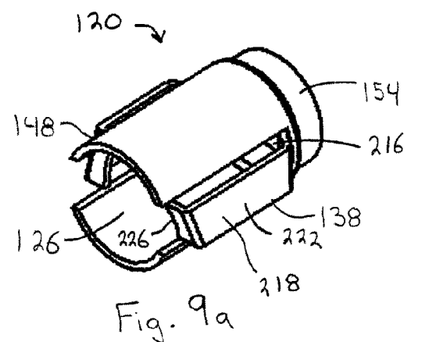
FIG. 9a is a first perspective view illustration of an exemplary crimp-type flexible cable connector for use in a junction box with integrated connectors in accordance with the present invention.
Figure 9B:
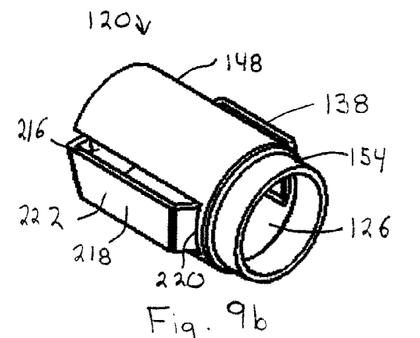
Figure 9C:
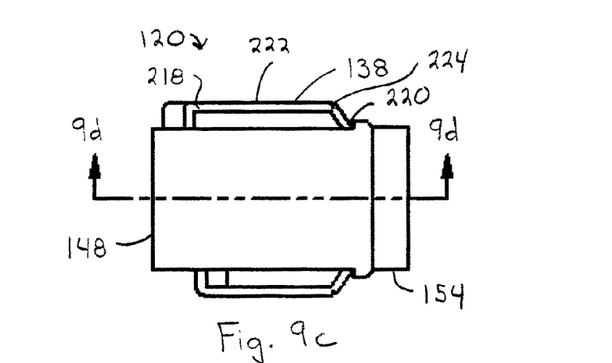
Figure 9D:
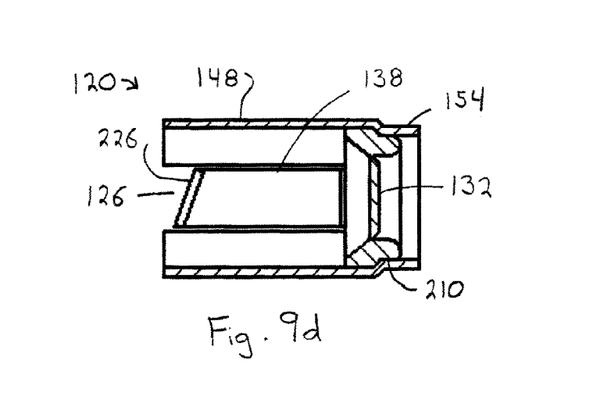
FIG. 9d is a cross-section view of the exemplary crimp-type flexible cable connector of FIG. 9a, as taken along line 9d-9d of FIG. 9c.

An exemplary double bite flexible cable connector 118 for use in a junction box with integrated connectors in accordance with the present invention is illustrated in, and will be described with reference to, FIG. 7. This type of connector 118 may be used to connect flexible metal-clad or armored cable or flexible metallic wiring conduit to the junction box 100. The double bite connector 118 includes a body portion 146 and a neck portion 152, which together define a central passageway 124 through which electrical wiring is passed into the interior 117 of the junction box 100. The body portion 146 of the connector 118 supports the connector structure 136 for securing wiring to the connector 118. The neck portion 152 of the connector 118 is used to mount the connector 118 to the junction box in a non-removable manner, as described above. The various components of the connector 118 may be made from steel or another appropriate material using known manufacturing techniques.

The connector structure 136 of the double bite connector 118 includes two slots 200 formed in the body 146 of the connector 118. The two slots 200 are formed parallel to each other and perpendicular to the axis of the connector passageway 124. A threaded fastener hole 201 is formed in the body 146 of the connector 118, preferably centered between the two slots 120. A U-shaped clip 202 is positioned in the slots 200, with each leg 203 of the clip 202 extending through one of the slots 200 into the connector passageway 124. (The clip 202 may be formed from a small strip of steel that is bent into the desired shape, or by any other appropriate method using any other appropriate material.) The ends 204 of each leg 203 of the clip 202 preferably may be curved, so as to conform to the shape of, e.g., a wiring cable that is to be supported in the connector passageway 124. Also, the distance between the slots 200, and thus the distance between the legs 203 of the clip 202, may be selected so as to match with the spacing of spirals on the sheathing of cables to be secured in the connector 118. A screw 206 is extended through the portion of the U-shaped clip 202 between the legs 203 thereof and into the threaded fastener hole 201 in the body 146 of the connector. (The screw 206 may be held in place on the clip 202 by a screw retaining ring or clip 208.) With a cable or other wiring structure positioned within the passageway 124 of the connector 118, the screw 206 may be turned to force the ends 204 of the legs 203 of the clip 202 into the passageway 124 and against the cable or other wiring structure, thereby to secure the cable or wiring structure to the connector 118.

For this exemplary connector 118, the removable plug 130, that is used to block the passageway 124, should a particular connector 118 of this type that is non-removably mounted to a junction box 100 in accordance with the present invention not be used in a particular installation, may be implemented as part of a throat insert 210 that is positioned in the passageway 124 of the connector 118 where the body 146 of the connector 118 joins the neck portion 152 thereof. An exemplary throat insert 210 of this type is illustrated in, and will be described in detail with reference to, FIG. 8. As illustrated, the throat insert 210 is in the general form of a ring. The outer circumference of the throat insert is stepped, from a larger circumference, corresponding to the inner circumference of the connector passageway 124 through the body portion 146 of the connector, to a smaller circumference, corresponding to the inner circumference of the connector passageway 124 through the neck portion 152 of the connector. Thus, the throat insert may be mounted in the connector passageway 124 where the body 146 of the connector 118 joins the neck portion 152 thereof by a simple compression fit. The interior circumference 212 of the throat insert 210 preferably also is stepped or tapered to form a wider aperture at the connector body 146 side thereof than at the connector neck 152 side thereof. Thus, the throat insert 210 acts as a liner for the connector passageway 124 that reduces the passageway diameter at the point of entry into the interior 117 of the junction box 100. This reduction may be required to meet industry standards. In use, an electrical wiring cable with sheathing attached is secured in the body portion 146 of the connector 118, as described above. The individual wire conductors which are to extend from the cable into the interior 117 of the junction box, and which may typically be covered with a non-conductive material, are typically stripped of the cable sheathing before the cable is secured to the conductor 118. These un-sheathed conductors take up less space than the sheathed cable, and are thus more appropriately supported by, and fill up the space provided by, the opening at the narrow end of the throat insert 210. This prevents a large opening into the junction box though the connector 118 even when wiring is run therethrough.

The throat insert 210 preferably may be formed of nylon or another similar plastic or other material by molding or another conventional or appropriate process. The removable plug 130 may be integrally formed along with and as part of the throat insert 210 as part of the manufacturing process. As illustrated, the removable plug 130 is positioned to block the central aperture of the throat insert 210, and thus to block the passageway 124 through the connector 118 in which the throat insert 210 is mounted. However, the removable plug 130 is formed so that it is joined to the rest of the throat insert 210 by only a small amount of material 214. Thus, the removable plug 130 may be removed easily by an electrician or other installer if the connector 118 in which the throat insert 210 is mounted is to be used to connect electrical wiring to a junction box 100 in accordance with the present invention.

An exemplary crimp-type flexible cable connector 120 for use in a junction box with integrated connectors in accordance with the present invention is illustrated in, and will be described with reference to, FIG. 9. This type of connector 120 may be used to connect flexible metal-clad or armored cable or flexible metallic wiring conduit to the junction box 100. The crimp-type connector 118 includes a body portion 148 and a neck portion 154, which together define a central passageway 126 through which electrical wiring is passed into the interior 117 of the junction box 100. The body portion 148 of the connector 120 supports the connector structure 138 for securing wiring to the connector 120. The neck portion 154 of the connector 120 is used to mount the connector 120 to the junction box 100 in a non-removable manner, as described above. The various components of the connector 120 may be made from steel or another appropriate material using known manufacturing techniques.

The connector structure 138 of the crimp-type connector 120 includes at least two axial slots 216 formed extending along the body 148 of the connector 120. Preferably, the two axial slots 216 are formed parallel to each other along the axis of the connector passageway 126. A bendable prong 218 is formed extending along and above each of the axial slots 216. Each bendable prong 218 is attached at one end 220 thereof to the body 148 of the connector at one end of the axial slot 216. The prong 218 is bent near this end 220 of the prong 218 such that an elongated body portion 222 of the prong 218 extends parallel with the axial slot 216 along the body 148 of the connector 120, with the elongated body portion 222 of the prong 218 separated or elevated from the axial slot 116. A transverse groove 224 may also be formed in the prong 218 near this end 220 thereof, to facilitate easy bending of the prong 218 for securing a cable or other wiring structure to the connector 120, as will be described in more detail below. The prong 218 is bent near the second end 226 thereof such that the second end 226 of the prong 218 is directed inward toward the passageway 126 of the connector 120. This end 226 of the prong 218 preferably may be curved, so as to conform to the shape of, e.g., a wiring cable that is to be supported in the connector passageway 126. Also, the end 226 of the prong 218 may be formed at an angle, such that the orientation of the end 226 of the prong 218 corresponds to the spirals on the sheathing of a cable to be supported by the connector 120. (A flexible metal-clad cable is usually sheathed within a corrugated cover, often formed of a helically wound ribbon of metal or plastic, which serves to protect the wires of the cable while maintaining much of the cable's flexibility.) With a cable or other wiring structure positioned within the passageway 126 of the connector 120, the prongs 218 are bent inward toward the slots 216 (using a tool such as pliers or the like) such that the ends 226 of the prongs 218 are forced into the passageway 126 and against the cable or other wiring structure, thereby to secure the cable or wiring structure to the connector 120.

For this exemplary connector 120, the removable plug 132, that is used to block the passageway 126, may be implemented as part of the throat insert 210 described previously. The throat insert 210 may be positioned in the passageway 126 of the connector 120 where the body 148 of the connector 120 joins the neck portion 154 thereof.

Figure 10A:
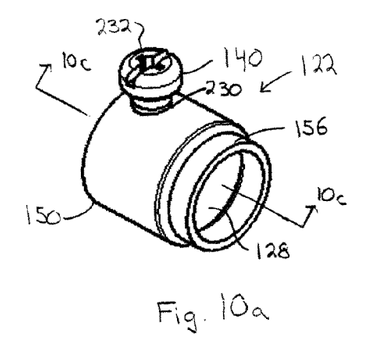
FIG. 10a is a perspective view illustration of an exemplary wiring conduit connector for use in a junction box with integrated connectors in accordance with the present invention.
Figure 10B:
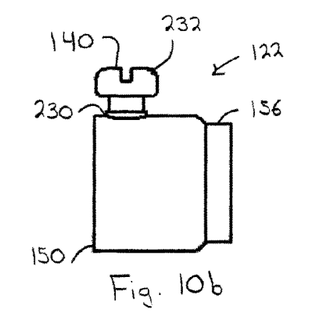
Figure 10C:
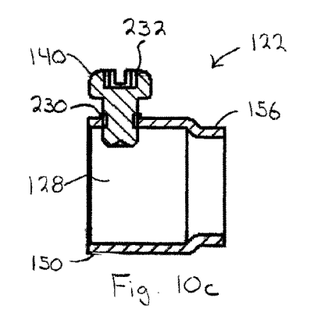

An exemplary electrical wiring conduit connector 122 for use in a junction box with integrated connectors in accordance with the present invention is illustrated in, and will be described with reference to, FIG. 10. This type of connector 122 may be used to connect EMT (Electrical Metallic Tubing) conduit, or any other type of plastic or metallic conduit for electrical wiring, to the junction box 100. (Electrical cable or wiring is often run through pipes or similar conduits between junction boxes. The pipes/conduits protect the wiring from moisture, vermin, or other conditions that might damage the wiring or otherwise interfere with transmission along the wires.) The conduit connector 122 includes a body portion 150 and a neck portion 156, which together define a central passageway 128 through which electrical wiring is passed into the interior 117 of the junction box 100. The body portion 150 of the connector 122 supports the connector structure 140 for securing wiring to the connector 122. The neck portion 156 of the connector 122 is used to mount the connector 122 to the junction box 100 in a non-removable manner, as described above. The various components of the connector 122 may be made from steel or another appropriate material using known manufacturing techniques.

The connector structure 140 of the conduit connector 122 includes a threaded aperture 230 formed through the body 148 of the connector 122. The threaded aperture 230 is formed perpendicular to the axis of the connector passageway 128. A set screw 232 is provided in the threaded aperture 230. With the end of a piece of wiring conduit 234 positioned within the passageway 128 of the connector 122 (as illustrated in FIG. 1), the set screw 232 is tightened such that the end of the screw 232 is forced into the passageway 128 and against the outer wall of the conduit 234, thereby to secure the conduit 234 to the connector 120.

Figure 11A:
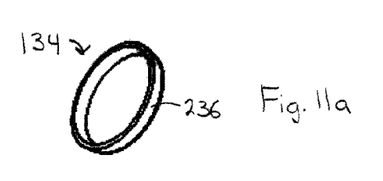
FIG. 11a is a perspective view illustration of an exemplary knockout plug for use with the exemplary wiring conduit connector of FIG. 10.
Figure 11B:
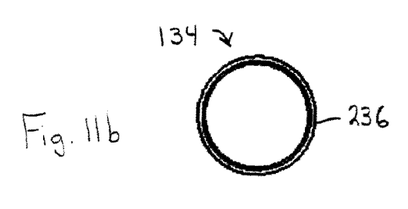
Figure 11C:
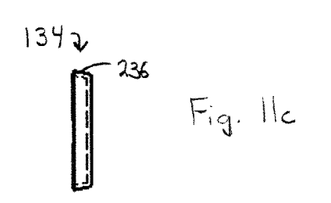

For this exemplary connector 122, the removable plug 134, that is used to block the passageway 128, may be implemented as a knockout plug 134 made of steel or another appropriate material, as illustrated in FIG. 11. The knockout plug 134 may be formed from a thin disk of metal that is formed to have angled sides 236. The knockout plug 134 may be positioned in the passageway 128 of the connector 122 where the body 150 of the connector 122 joins the neck portion 156 thereof. The plug 134 is sized to fit snugly within the passageway 128, but is easily removable if the connector 122 of this type on a junction box 100 in accordance with present invention is to be used for wiring in a particular installation. The angled sides 236 of the knockout plug 134 facilitate insertion of the plug 134 into the passageway 128 and allow a tight fit to be achieved.

It is understood that the invention is not confined to the particular construction and arrangement of parts herein illustrated and described, but embraces such modified forms thereof as come within the scope of the following claims. In particular, the invention is not intended to be limited to a junction box having non-removably attached thereto the preferred connectors described above (and/or to the foregoing exemplary modifications), but rather is intended to be limited only by the claims set out below. Thus, the invention encompasses all different connectors that fall literally or equivalently within the scope of these claims.

What is claimed is:

1. A junction box for electrical wiring, comprising:
   a. a first side panel and an opposing second side panel extending from a back panel to surround a junction box interior, the first and second side panels each having at least one wiring aperture formed therein;
   b. a third side panel and a fourth side panel, the third and fourth side panels affixed to the back panel and to the first and second side panels on opposing sides of the junction box; and
   c. a connector:
      i. in one of the side panels,
      ii. the connector defining a passageway for wiring into the junction box interior,
      iii. wherein:
         1) the connector extends outwardly from one of the side panels,
         2) no portion of the connector extends into the junction box interior; and
         3) the connector is a crimp-type flexible cable connector including:

a) a connector body portion defining the passageway opening into the junction box interior;
b) a bendable prong extending from the connector body portion, the bendable prong being configured to bend into the passageway of the crimp-type flexible cable connector to secure electrical wiring within the passageway; and
c) a transverse groove formed in the bendable prong, the transverse groove configured to facilitate bending of the bendable prong into the passageway.

2. The junction box of claim 1 wherein:
a. one of the side panels includes a collar extending outwardly therefrom,
b. the connector body portion of the crimp-type flexible cable connector is complementarily fit against the collar, and
c. the crimp-type flexible cable connector is non-removably mounted to the collar extending from one of the side panels by interlocking dimples formed between the connector body portion and the collar.

3. The junction box of claim 1 further including a second connector, the second connector being configured differently from the crimp-type flexible cable connector.

4. The junction box of claim 3 wherein the second connector is of a connector type selected from the group consisting of:
a. a double-bite flexible cable connector type; and
b. a conduit connector type.

5. The junction box of claim 4 wherein:
a. each of the connectors includes a cylindrical connector body portion defining the passageway, and
b. at least one of the connectors further includes a cylindrical throat insert situated within the passageway, the throat insert reducing a diameter of the connector body portion.

6. The junction box of claim 4 wherein the double-bite flexible cable connector includes:
a. a connector body portion having two slots on opposing sides of a fastener hole, the two slots and fastener hole extending between outer and inner surfaces of the connector body portion of the double-bite connector; and
b. a clip having two legs with curved ends, the legs being complementarily receivable through the two slots in the connector body portion of the double-bite connector.

7. The junction box of claim 6 wherein:
a. the fastener hole is threaded, and
b. the clip is securable to the connector by:
i. inserting the two legs through the two slots formed in the connector body portion of the double-bite connector and into the passageway, and
ii. engaging a threaded connector structure to the threaded fastener hole as the threaded connector structure enters the passageway.

8. The junction box of claim 3 wherein the second connector has:
a. a second connector body portion defining a second passageway into the junction box interior;
b. a threaded aperture formed in the second connector body portion; and
c. a threaded connector structure extending through the threaded aperture and into the second passageway.

9. The junction box of claim 1 wherein:
a. the connector body portion includes an axial slot formed therein, the axial slot extending between outer and inner surfaces of the connector body portion, and
b. the bendable prong is bendable into the passageway through the axial slot formed in the connector body portion.

10. The junction box of claim 9 wherein the bendable prong includes a first end and an opposing second end,
a. the first end being flexibly attached to one end of the axial slot,
b. the second end being bendable into the passageway with respect to the first end.

11. A junction box for electrical wiring including:
a. first, second, third, and fourth side panels extending from a back panel to define a junction box interior, and
b. at least one crimp-type flexible cable connector extending from one of the side panels, the crimp-type flexible cable connector including:
i. a connector body portion defining a passageway opening into the junction box interior,
1) the connector body portion including at least one axial slot formed therein,
2) the axial slot extending between outer and inner surfaces of the connector body portion;
ii. at least one bendable prong flexibly affixed to the connector body portion at one end of the axial slot, the bendable prong being bendable through the axial slot and into the passageway defined by the connector body portion; and
iii. a transverse groove formed in the bendable prong, the transverse groove configured to facilitate bending of the bendable prong into the passageway.

12. The junction box of claim 11 wherein:
a. one of the side panels includes a cylindrical collar extending out from one of the side panels away from the junction box interior,
b. the connector body portion is complementarily fit about the collar, and
c. the connector body portion and collar include interlocking dimples formed therebetween, the interlocking dimples non-removably mounting the connector body portion to one of the side panels.

13. The junction box of claim 12 further including a double-bite flexible cable connector having:
a. a connector body portion having two slots formed therein, the two slots extending between outer and inner surfaces of the connector body portion of the double-bite connector; and
b. a u-shaped clip having two legs with curved ends,
i. the legs being complementarily receivable through the two slots in the connector body portion of the double-bite connector and into the passageway,
ii. the curved ends being complementary to a cable extending into the junction box interior via the passageway formed by the connector body portion of the double-bite connector.

14. The junction box of claim 13 wherein no portion of the double-bite flexible cable connector extends into the junction box interior.

\* \* \* \* \*